Figure 1:
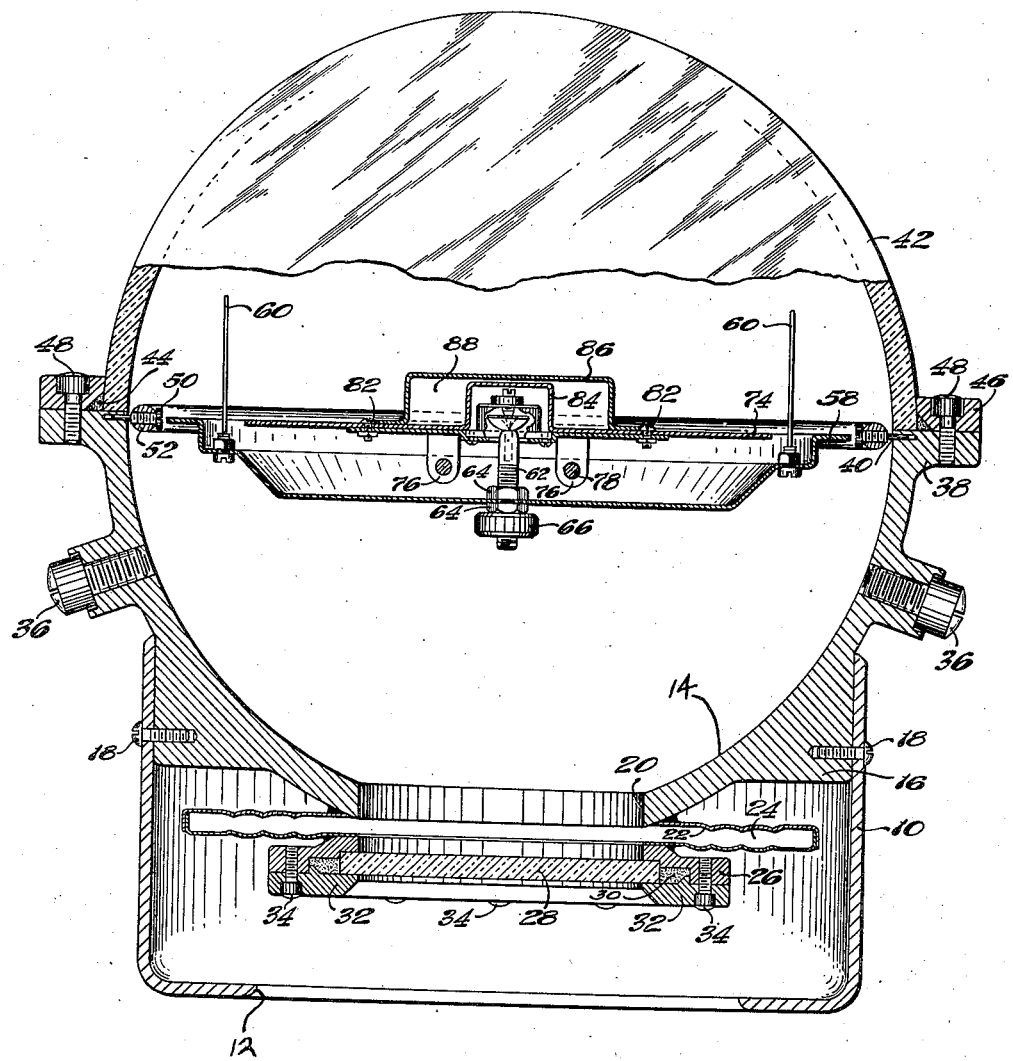

Sept. 30, 1947.   W. G. WHITE   2,428,346
MAGNETIC COMPASS
Filed March 11, 1947   6 Sheets-Sheet 1

INVENTOR.
Wilfred Gordon White
BY Kenway & Witter
Attys

Sept. 30, 1947.  W. G. WHITE  2,428,346
MAGNETIC COMPASS
Filed March 11, 1947  6 Sheets-Sheet 2

INVENTOR.
Wilfred Gordon White
BY Kenway & Witter
Attys.

Sept. 30, 1947.  W. G. WHITE  2,428,346
MAGNETIC COMPASS
Filed March 11, 1947  6 Sheets-Sheet 4

INVENTOR.
Wilfrid Gordon White

Sept. 30, 1947.　　　W. G. WHITE　　　2,428,346
MAGNETIC COMPASS
Filed March 11, 1947　　　6 Sheets-Sheet 6

INVENTOR.
Wilfred Gordon White
BY
Henway & Witter
Attys.

Patented Sept. 30, 1947

2,428,346

UNITED STATES PATENT OFFICE 2,428,346

MAGNETIC COMPASS

Wilfrid Gordon White, Waban, Mass.

Application March 11, 1947, Serial No. 733,861

12 Claims. (Cl. 33—223)

My invention relates to magnetic compasses and more particularly to an improved spherical compass providing greater accuracy and convenience than previous instruments known in the art.

There are two important compass problems toward the solution of which my invention is addressed. One problem is to produce a compass in which the card will remain substantially in a given plane, unaffected by the rolling and pitching of the vessel and the resultant violent accelerations and shocks; this ideal cannot, however, be accomplished at the risk of decreasing the sensitivity of the card to magnetic influences.

The other principal problem is to overcome the error arising from the departure of the lubber line from its perpendicular relation to the compass card, an error magnified in the case of a sailing vessel sailing at a substantial angle of heel and simultaneously pitching. In a spherical compass the card remains fairly level, but the lubber line is inclined in varying amounts by the forces acting on the pendulous bowl, and the indicated heading may vary as much as ten degrees as the ship rises and falls with the seas. With a flat compass the swirl of the liquid in the compass bowl inevitably induces rotational moment to the compass card so that on relatively small ships, such as submarine chasers, the helmsman must develop an inituitive sense concerning the compass and automatically and unconsciously compensate for such errors from moment to moment.

The chief value of a conventional spherical compass is the stability resulting from the damping effect on the compass card of the liquid filling the bowl. However, practical reasons make it undesirable to make the compass card large enough in diameter to take advantage of the maximum damping action available. To do so would involve employing heavier directive elements and supports, thus increasing the mass of the card elements and defeating the damping effect by the increase in the ratio between the masses of the card and the liquid. Furthermore the second problem would not be touched by the expedient of increasing the diameter of the card.

I have invented a form of spherical compass which offers a solution common to both problems. In one aspect my invention comprises a saucer-shaped member almost as large in diameter as the inside of the sphere and mounted for cardanic movement substantially parallel to and adjacent the compass card in position substantially to bisect the sphere and providing a mount for the lubber line. The damping effect of the nearly equal volumes of liquid above and below the member and the sympathetic damping resulting from the juxtaposition of the card and the member result in a compass abnormally resistant to acceleration and shocks; when the ship rolls, the card and the member both remain level, and the angle between the lubber line and the card remains constant. Trials of compasses constructed according to my invention reveal them to be much more stable and accurate than instruments heretofore available.

Inasmuch as the liquid in the bowl is not set in motion when the compass is rolled, twisted, or otherwise moved, but remains quiescent, the liquid offers resistance to motion of the compass card and the saucer or disk. This action is enhanced the more nearly the card and disk come to bisecting the sphere of liquid so that there are substantially equal volumes of the liquid on both sides of the assembly. I have found it is practical and beneficial to have the rim of the saucer-shaped member, the compass card, and the pivot point for the compass card all lying in a plane coincident with the equator of the bowl. This disposition of the elements results in optimum stability of the compass card and disk, deriving from the stability of the liquid. Furthermore, it is highly desirable to construct the compass card and saucer-shaped member assembly from materials as light as is practical. The more nearly the mass of the compass and saucer-shaped member approaches a ratio of unity with respect to the mass of liquid, volume for volume, the more perfectly will the liquid serve to damp the compass card. It should be pointed out that the combination of the glass hemisphere and the contained liquid forms a lens which magnifies the indicia appearing on the surface of the compass card. Consequently the card may be both small and light, and the saucer-shaped member may be of greater area, thus promoting stability.

In addition to the stated advantages obtained by the use of my novel compass is the further feature that a compass so constructed may be secured rigidly to the ship's structure without the costly and elaborate trunnions and gimbal rings heretofore found necessary. Of course, if the compass is to be associated with the conventional azimuth circle, it will generally be found necessary to mount the compass in external gimbals so that the azimuth circle will remain substantially level.

While compasses constructed according to my invention are accurate navigation instruments suitable for use on ships and aircraft, the great increase in stability afforded by my novel construction makes it possible to construct a compass capable of use in automobiles as a useful instrument in contrast to previous "auto compasses" which have been little more than unreliable toys.

Figure 2:
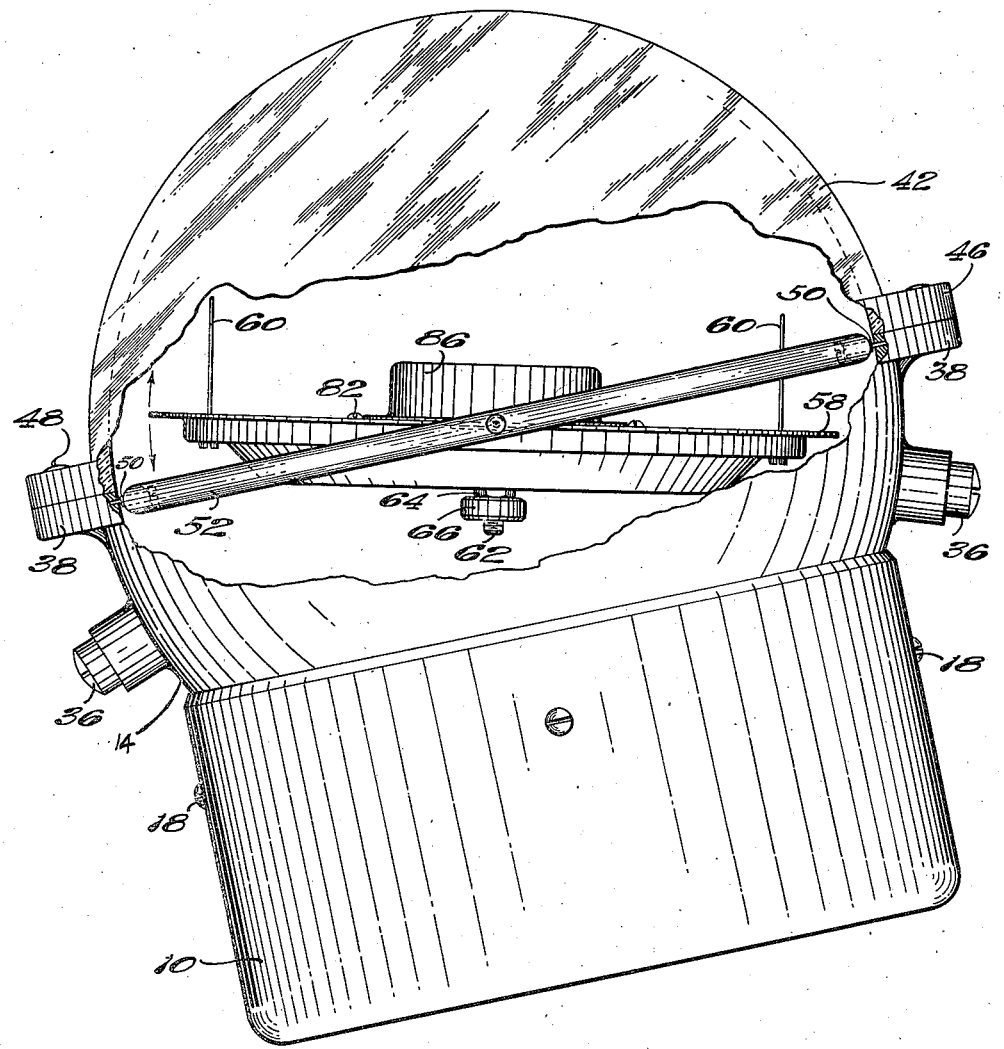
Figure 3:
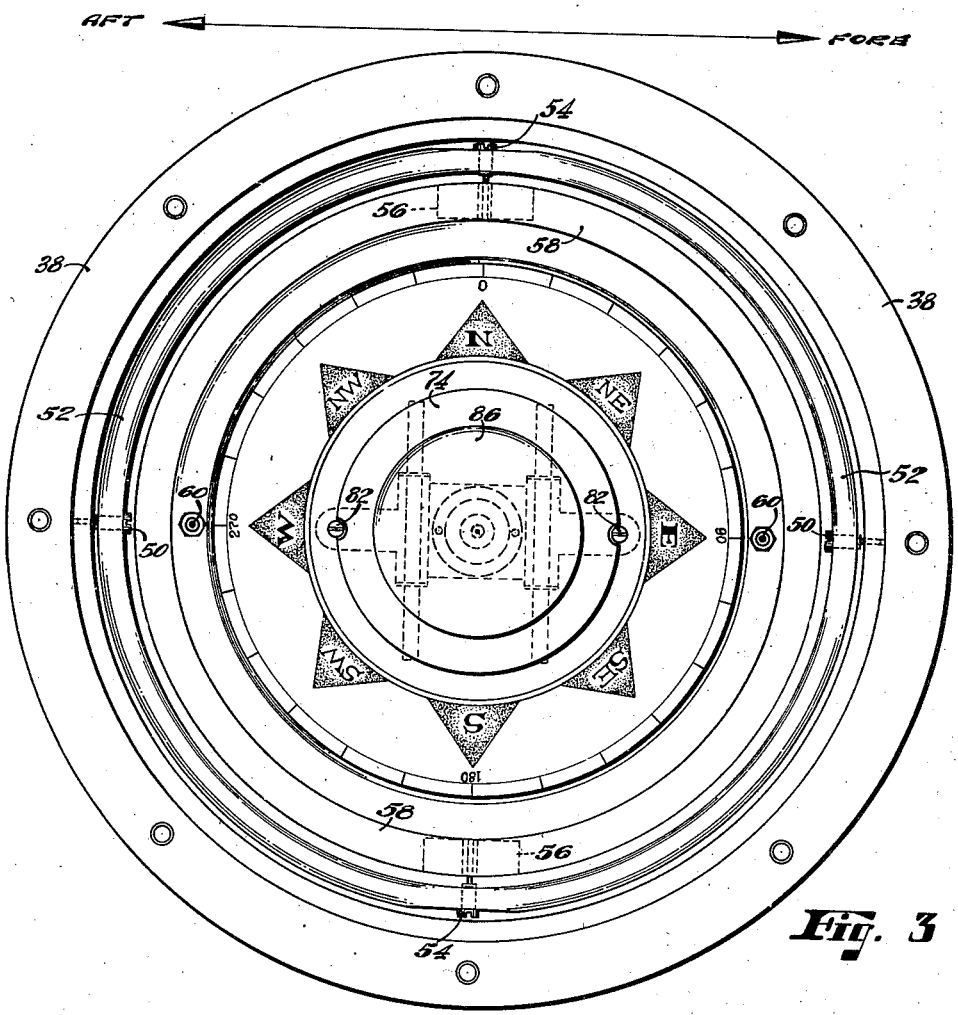
Figure 9:
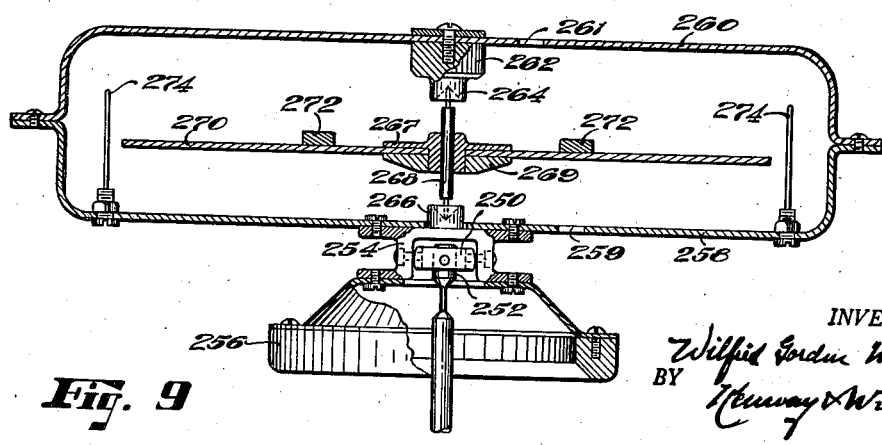
Figure 4:
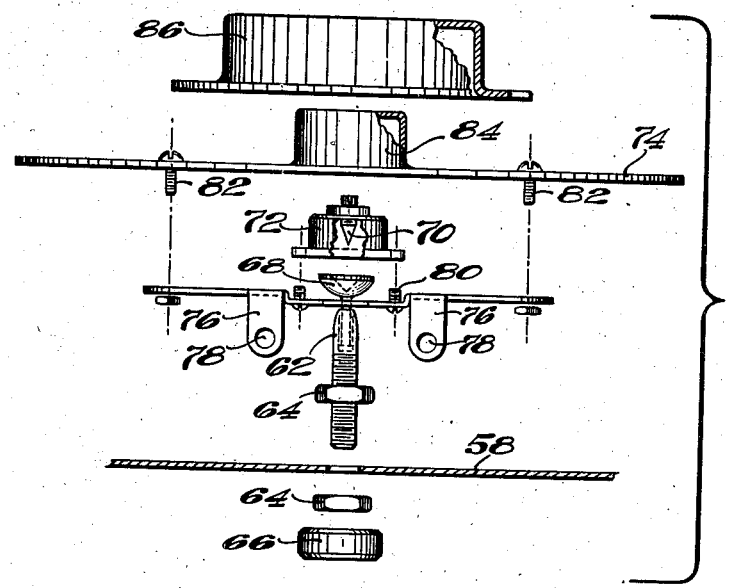
Figure 5:
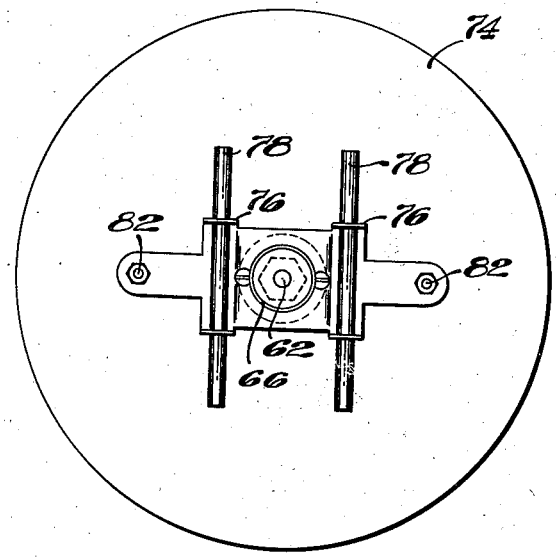
Figure 6:
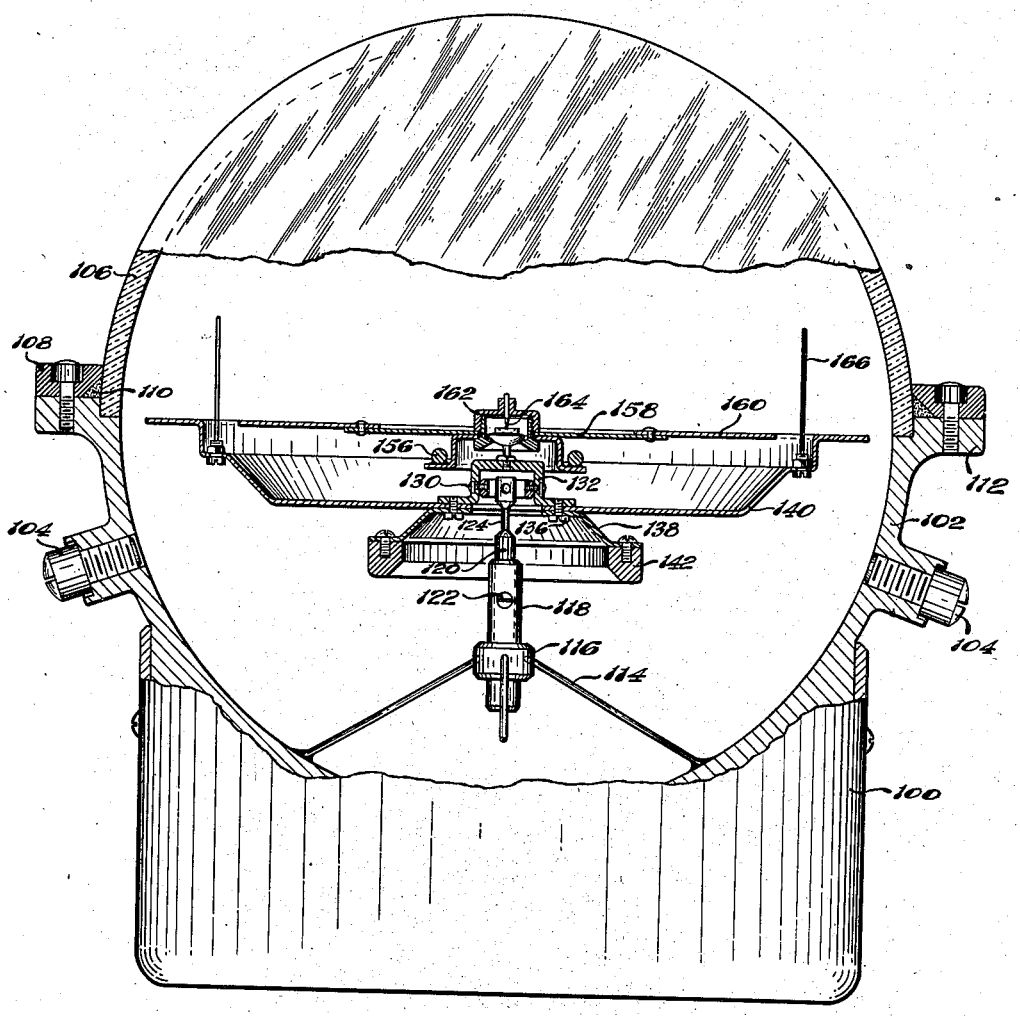
Figure 7:
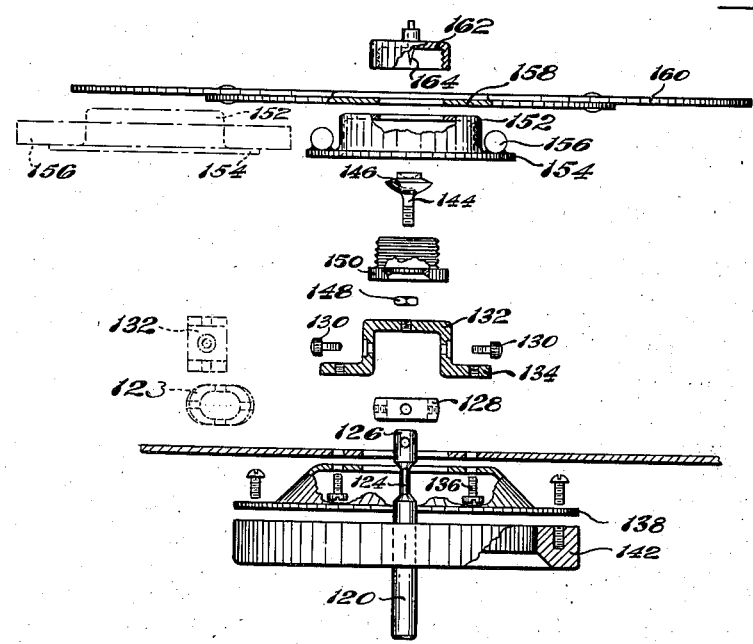
Figure 8:
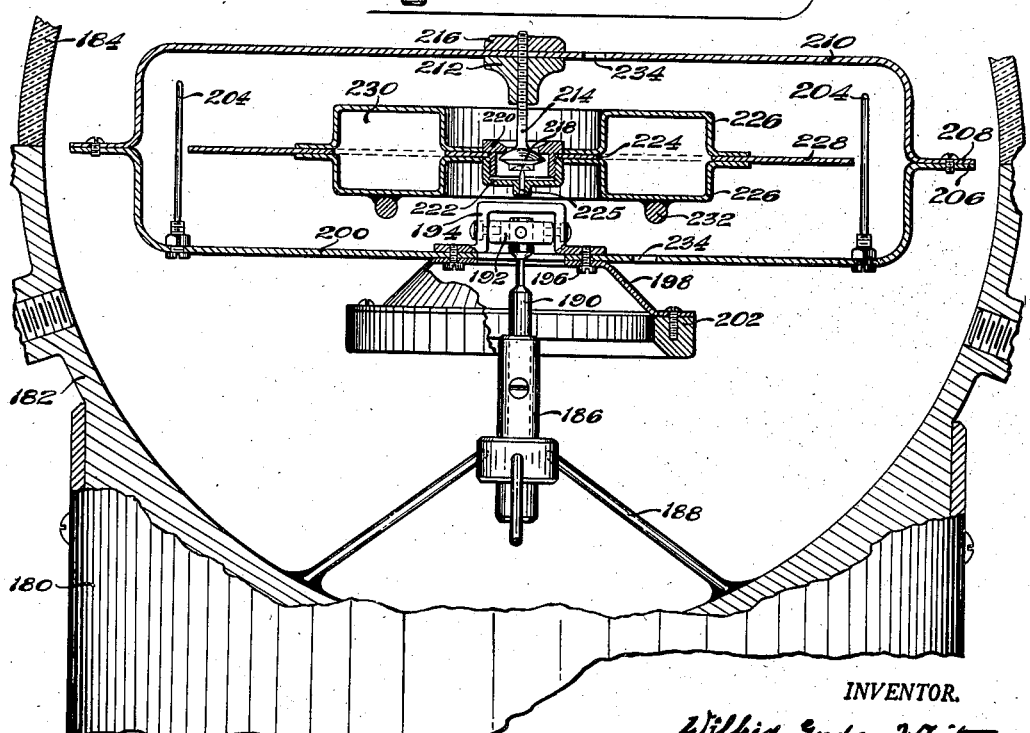

These and other objects and features of my invention will be more readily understood and appreciated from the following detailed description of preferred embodiments thereof selected for purposes of illustration and shown in the accompanying drawings, in which:

Fig. 1 is a view in cross section through the center of a compass constructed in accordance with my invention, Fig. 2 is a view in end elevation showing the response of the compass to a roll or heel, Fig. 3 is a plan view of the compass with the cover removed, Fig. 4 is an exploded elevation of the card mount assembly, Fig. 5 is a bottom plan view of the magnet holder, Fig. 6 is a view, partly in cross-section and partly in elevation, of another embodiment of my invention, Fig. 7 is an exploded elevation of the internal assembly of the compass shown in Fig. 6, Fig. 8 is a view in cross-section of a third embodiment of my invention, and Fig. 9 is a view in cross-section through a fourth type of internal compass assembly.

In the modification shown in Figs. 1–5 the compass is mounted on a cup-shaped base 10 of brass, aluminum or other non-magnetic material; in order to provide for bottom lighting there is provided a centrally disposed hole 12 in the bottom of the base 10, it being understood that the compass may be mounted in a binnacle or other support having an electric lamp arranged beneath the base 10. Secured to the base by a number of brass screws 18 is a hemispherical shell or bowl 14 provided with an annular shoulder 16 dimensioned to fit snugly into the base 10. The bowl 14 may conveniently be of spun brass or other suitable material, although a machined casting may be used if desired. The requirements are that the bowl be of non-magnetic material and that the inner wall be as close to a true hemisphere as is practically possible. Departure from the hemispherical form, or the occurrence of flats, protuberances, etc., impairs the ability of the bowl to roll about the liquid filling it and thus causes swirling and turbulent agitation of the liquid.

The bottom of the bowl 14 contains a circular opening 20 to the lower edge of which is sealed an expansible bellows 22 defining an expansion chamber 24 which changes in volume as the liquid expands or contracts in response to changes in temperature. A circular socket or frame 26 is sealed to the bottom of the bellows 24 and carries a disk 28 of glass or other translucent material held in place by a gland 32 working against a flexible gasket 30. The hole 12, the disk 78, and the opening 20 are aligned to transmit light to the interior of the bowl 14. A pair of drain plugs 36 are threaded into the wall of the bowl 14 approximately 180° apart.

The upper edge of the bowl 14 supports an integral outwardly projecting flange 38; also the upper edge receives the lower edge of a stout glass hemisphere 42 ground and polished to form as nearly as possible an optically correct true hemisphere. A retaining ring 46 fits over the flange 38, is bevelled on its inner face, and works against a compressible gasket 44. A series of machine screws 48 serves to hold the ring in place and clamp the glass hemisphere 42 to the bowl 14 in a fluid-tight seal.

A pair of pivot pins 50 work in grooves formed in the upper edge of the bowl 14 at 180° intervals, arranged to lie in the fore and aft axis of the compass and in the equator thereof. The pivot pins 50 support a large diameter, carefully balanced aluminum gimbal ring 52 normally sitting almost exactly in the equator of the compass and carrying a second pair of pivot pins 54 (Figs. 2 and 3) arranged in the athwartship axis of the compass. (By "fore and aft axis" and "athwartship axis" I intend to imply the corresponding axes of the craft in which the compass is mounted.) The pivot pins 54 work in bearings 56 mounted on the under side of a member 58 substantially concentric with the sphere of the compass and made of thin gauge aluminum, magnesium, or very light translucent plastic. The member 58 partakes generally of the appearance of a shallow saucer; as shown in the drawings it includes a flat annular rim, broad enough to offer substantial damping area, merging into an offset flat center portion. By the term "saucer-shaped member," I intend to designate any comparable shallow disk having a diameter sufficiently large to cover a substantially complete equatorial plane of the containing sphere. It will be found advisable to depart from a circular flat disk only to such an extent as may be required to accommodate the compass card and its pivot mount. The essence of the invention lies in providing a member suitably dimensioned to take full advantage of the stability of the liquid in the sphere, and the optimum is the largest practical amount of surface lying in an equatorial plane and acted upon by approximately equal volumes of liquid. The gimbal ring 52 and the member 58 are so dimensioned that the diameter of the latter is only slightly less than the inside diameter of the compass sphere, and the fact that the member is aproximately concentric with the sphere is significant because the member may be tilted through 360° without striking the inside wall of the sphere. Two upright pins 60 are secured to the disk 58 at 90° intervals to serve as fore and aft lubber lines.

Secured to the center of the member 58 by a pair of clamping nuts 64 is a vertical metal post 62 having a depending portion threaded to receive a balancing weight 66 and projecting upwardly as a hollow pillar receiving the stem of a jewelled pivot cup 68 cooperating with a cone point pivot pin 70 mounted in a shallow metal housing 72 supported on a conventionally marked, flat compass card 74 made of thin, translucent plastic material. The compass card 74 lies within the dished portion of the member 58 and is aproximately in the same plane as the elevated margin thereof. The point of the pivot pin 70, the compass card, and the margin of the member all lie normally in the equator of the bowl.

A bracket or frame 76 is provided with depending stirrups for holding a pair of bar magnets 78 and is secured by a pair of screws 80 to the housing 72. Also a pair of bolts 82 secure the bracket directly to the card.

Surrounding the housing 72 and sealed to the compass card 74 is a metal cap 84 in turn housed in a larger cap 86 also sealed tightly to the card 74. The caps 84 and 86 define between them a fluid-tight float chamber 88 to provide buoyancy counteracting the weight of the elements and free the pivot for rotational movement. The pendulous weight 66 is required to compensate for the dip of the magnets.

In selecting the materials to comprise the compass it is, of course, necessary to avoid the use of magnetic materials and also to employ elements as light as is practical. Furthermore the best results will be obtained if the moments of the disk 58 and the compass card assembly are the same, because they will then remain substantially parallel when the compass is subjected to acceleration and movement. The weight 66 is adjusted until the member 58 is counterbalanced so that it will barely overcome the friction of the pivots and seek a horizontal position. Also, the best results are obtained when the distance between the plane of the pivots 50 and the working surface of the jewel pivot 68 is minimum.

The entire compass is filled with a neutral liquid from which all gas has been removed, the expansion chamber 24 taking care of changes in the volume of the liquid occasioned by variations in temperature.

The compass as a whole will of course move with the vessel on which it is mounted, but the liquid will remain undisturbed except for minor skin friction of the inside walls of the container and the eddy currents about the supporting elements. Inasmuch as the liquid remains undisturbed, there is no hydraulic force at work on the member, which may be regarded functionally as an inertia plane. The same is true of the compass card. Consequently the card and the lubber lines retain their positions as before the vessel moved. When the vessel, while upright, responds to a force introducing lateral accelerations at the compass, the member 58 and the card 74 are subject to the same acceleration since they have been adjusted to have the same vertical periods. The members would respond to the acceleration were it not for the fact that the member 58 effectively bisects the sphere of liquid. The ratio between the specific gravity of the liquid and that of the compass card and member 58, or inertia plane assembly is as close to unity as can practically be obtained. Consequently their response to acceleration is very similar and the development of differential velocities is minimized.

A second embodiment of my invention is illustrated in Figs. 6 and 7. As before, the compass is mounted in a cup-shaped base 100 and includes a bottom hemisphere 102 of spun brass or other suitable material provided with a pair of drain plugs 104 disposed 180° from each other. The expansion chamber and associated elements are not shown, and it is to be understood that an arrangement similar to that shown in Fig. 1 is employed. The bottom hemisphere is shouldered to receive the lower edge of a true glass hemisphere 106 held in position by a retaining ring 108 bearing on a circular gasket 110 and clamped by screws to an outwardly projecting flange 112 formed along the top side of the hemisphere 102. From points adjacent the bottom of the brass hemisphere 102 extend the legs 114 of a tripod support including a collar 116 supported by the legs 114 and permanently secured to a hollow sleeve 118. Fitting into the sleeve 118 is a cylindrical post 120 adapted to be secured in adjusted position by means of a set screw 122 and serving as a mount for a vertically disposed stem 124 carrying a cylindrical head 126 transversely bored to receive a pivot pin carried by a very small oval gimbal ring 128. The pivot pin extends parallel to the fore and aft axis of the vessel on which the compass is to be mounted. In turn, the gimbal ring 128 is bored to receive a pair of pivot pins 130 disposed in a line parallel to the thwartships axis of the vessel and working in a small lug 132 having the shape of an inverted U. The lug is thus cardanically mounted for movement with respect to the head 126. The lug, however, is not permitted to rotate about the axis of the head 126 of the post 120. The lug 132 has a pair of outwardly extending feet 134 provided with tapped holes to receive a pair of screws 136 which first pass through an inverted light metal disk 138 and through a large diameter flat, saucer-shaped member 140 which is substantially the same as the member 58 described in conjunction with Fig. 1. Secured to the bottom of the disk 138 is an annular weight 142 and it will be seen that the weight 142, the small inverted disk 138, the large member 140 and the lug 132 are clamped together as an integral assembly by means of the screws 136. As before, the weight 142 serves to maintain the member 140 level and may be regarded as a pendulum.

Mounted in the top of the lug 132 and in alignment with the stem 124 and the post 120 is a stem 144 carrying at its upper end a jeweled pivot bearing 146. The stem 144 threads into the top of the lug 132 and is maintained in position by means of a lock nut 148. The pivot bearing 146 is retained in an internally flanged bushing 150 in the manner of a ball and socket joint so that the lug 132 and the pivot bearing 146 are free to move universally with respect to the bushing 150. The bushing 150 is also externally flanged at its base and its barrel is externally threaded. Resting on the base flange of the bushing 150 is a light metal cap 152 having an outwardly extending base flange 154 to the top of which is soldered a pair of bar magnets 156. A small disk 158 rests on the top of the cap 152 and provides a mount for an annular compass card 160 provided with conventional indicia. An internally threaded cap 162 carries in its top wall a cone point pivot 164 and engages the external threads on the bushing 150. The dimensions are such that the cap 162 may be screwed onto the bushing 150 to clamp the disk 158 and the cap 152 between the bottom of the cap 162 and the base flange of the bushing 150. Also the cone point 164 is engaged on the pivot bearing 146 and the whole upper assembly is free to rotate universally from the pivot bearing.

It will be observed that the construction shown in Figs. 6 and 7 makes possible the elimination of the relatively large and heavy gimbal ring shown in Fig. 1. This in turn makes it possible to extend the diameter of the saucer-shaped member 140 nearly to the inner wall of the compass bowl. In principle the behavior of the compasses shown in Figs. 1 and 6 is the same. That is to say, the member 140 is cardanically mounted. Its exterior rim is in the same plane as the pivot point and the compass card and is broad enough to present substantial damping area. As before, lubber lines 166 are secured to the member 140. The entire assembly may be adjusted vertically by manipulating the set screw 122 and the post 120. The distance between the pivot point 164 and the pivot pins 130 should be as short as possible since it is desirable to have both centers of pivotal movement lie as close as possible to the center of the sphere. As before, it is best to construct all of the elements of the assembly from the lightest materials consistent with requirements for strength and rigidity since the desired damping effect is best obtained when the ratio of the specific gravity of the liquid and the compass assembly approaches unity. Also the center of rotation and the planes of the compass card and the member 140 should as nearly as possible bisect the sphere of liquid in the compass bowl.

As before noted the action of the compasses shown in Figs. 1 and 6 is fundamentally the same. Theoretically the embodiment shown in Fig. 6 will be more efficient because the gimbal ring has been reduced in size, but the embodiment shown in Fig. 1 offers certain manufacturing advantages and can be constructed more inexpensively. It should be pointed out that the small volume between the compass card and the saucer-shaped member 140 is fully occupied by liquid and will produce a sympathetic action between the two if either or both are disturbed from their settled positions. It will be readily apparent that the azimuthal swirl of the liquid following a violent displacement of the compass element from the magnetic meridian will be damped out rapidly by the close relationship of the card and the member 140. It should also be noted that the free action of the card in the embodiment shown in Fig. 1 is unlimited. Therefore the compass need not be mounted level but may be secured to an inclined surface such as the dashboard on an automobile. In the embodiment shown in Fig. 6 the compass card may turn as much as 85° from the horizontal, a freedom of movement more than sufficient for all ordinary uses.

In Fig. 8 I have shown a third embodiment of my invention, based on the same principles that govern the above described modifications and offering certain advantages. As in the case of the compass shown in Fig. 6, I provide a cup-shaped base 180 supporting a spun brass hemisphere 182 secured as before to a true glass hemisphere 184. As before, a sleeve 186 is supported on a tripod support 188 and carries a vertically adjustable post 190. A very small gimbal ring 192 is pivotally supported as shown in Figs. 6 and 7 and above described and, as before, a lug 194 is pivotally mounted in the gimbal ring. The lug 194 is tapped to receive a pair of screws 196 which pass through a small metal inverted dish 198 and a large diameter saucer-shaped member 200. The inverted dish 198 carries an annular counterweight 202 and the member 200 is provided with an outwardly extending peripheral flange 206 to which is secured a similar flange 208 formed on a transparent member 210 similar to the member 200 but inverted. A socket 212 depends from the center of the inverted member 210 and is provided with a threaded hole in alignment with the post 190. A stem 214 is threaded into the socket 212 and locked in adjusted position by means of a nut 216. On the bottom of the stem 214 is an inverted jeweled pivot bearing 218 retained in an internally flanged bushing 220 in the manner of a ball and socket joint. A cap 222 is threaded over the bushing 220 and clamps to it a small ring 224 to which are secured internally projecting flanges of a pair of oppositely disposed annular casings 226 which also have outwardly extending flanges embracing and secured to an annular compass card 228. The casings 226 form between them an airtight float chamber 230. A pair of bar magnets 232 are soldered or otherwise secured to the bottom casing 226. A pivot pin 225 is mounted in the bottom wall of the cap 222. The buoyancy of the float chamber 230 is sufficient to float the compass card assembly and urge the pivot point 225 into low pressure engagement with the jeweled pivot bearing 218. It will be recognized that the pivot assembly is almost precisely similar to that shown in Fig. 7 except that in Fig. 8 it has been inverted. A pair of ports 234 are formed in the members 200 and 210 and provide means for the liquid to enter the chamber defined between them. In this embodiment the compass card and assembly of members 200 and 210 effectively bisect the sphere of liquid and the distance between the top of the pivot pin 225 and the pivots for the gimbal ring 194 is minimized. The construction shown in Fig. 8 offers the further advantage that the sympathetic damping action between the members 200 and 210 and the compass card is greatly enhanced by reason of the fact that the inertia plane, viz. the members, extends on both sides of the compass card. This construction relieves the supporting elements from the weight of the compass card so that all of the pivot bearings will function almost indefinitely. The principles underlying the action of the compass shown in Fig. 8 are the same as those operating in the first two embodiments described and need not be repeated. It will be recognized that either of the members 200 and 210 could be replaced by a spider, without departing from the spirit of the invention.

In Fig. 9 I have shown, somewhat diagrammatically, a fourth embodiment of the invention again employing a very small internal gimbal ring 250 pivotally mounted on a head 252 carried on a vertically adjustable post (not shown) mounted on a tripod support, (also not shown). A lug 254 is pivotally mounted on the gimbal ring 250 and provides support for a depending counterweight 256. Secured to the lug is a bottom saucer-shaped member or inertia plane disk 258, shaped as shown in Fig. 8, to which is secured a similar but inverted transparent member 260. The members are ported as shown at 259 and 261. The inverted member 260 carries a centrally disposed socket 262 in which is mounted a jeweled pivot bearing 264 in alignment with the head 252 and also aligned with a second jeweled pivot bearing 266 mounted on the top of the lug 254. A double-ended pivot pin 268 works in the bearings 264 and 266 and carries a bushing 267 and a cooperating locking member 269 which clamps to the pin 268 an annular compass card 270 on which are mounted a pair of flat bar magnets 272. Lubber lines 274 are appropriately mounted on the bottom member 258.

In this embodiment the compass card 270 is mounted in the same manner as the balance wheel of a watch. It is free to rotate with respect to the other elements of the assembly about the axis of the pivot pin 268, but the plane of the compass card will always remain parallel to the planes of the members 258 and 260. Accordingly the angle between the compass card and the lubber lines can never vary. As before, the saucer-shaped members function together as an inertia plane bisecting the sphere of liquid in the compass bowl so that the maximum damping action is obtained and the result is a compass much more stable than anything heretofore available. I feel it unnecessary to discuss further the theory of the action of the compass shown in Fig. 9 for the reason that it is similar to the discussions contained in the descriptions of the preceding embodiments of my invention.

The essence of my invention lies in the provision of a shallow member lying parallel to the compass card, substantially bisecting the sphere of liquid in the compass bowl, pivotally mounted with respect to the compass bowl and with respect to the compass card, and providing support for the lubber lines. Such a compass is abnormally stable because the aforesaid member functions as an inertia plane picking up stability from the stability of the liquid in the bowl and by sympathetic damping action lending further stability to the compass card proper. In addition to the enormous increase in stability thus obtained, I simultaneously stabilize the angle between the compass card and the lubber line. All of these factors contribute to make a much more efficient and dependable navigating instrument than has heretofore been known in the art. The fact that I have illustrated and described four embodiments of my invention does not mean that I have exhausted all of the possible modes in which my invention may be practiced, although they do represent the most practical and efficient embodiments of the invention now known to me.

Having now described my invention what I claim as new and desire to secure by Letters Patent of the United States is:

1. A compass comprising a truly spherical container having a transparent portion, a circular compass card disposed within said container and having substantially smaller diameter than the inside diameter of the container, a support for mounting said card substantially concentric with said container, a saucer-shaped member having a diameter nearly that of the inside of the container, a cardanic mount supporting said member closely adjacent and parallel to the compass card, and a neutral transparent liquid filling the container, said member having substantially flat areas in contact with said liquid.

2. A compass according to claim 1 wherein at least one lubber line is mounted on the saucer-shaped member.

3. A mariner's compass comprising a spherical bowl, a compass card supported for pivotal movement about a point substantially concentric with the bowl, a saucer-shaped member disposed within the bowl, parallel to and adjacent the compass card in position substantially to completely bisect the bowl, a cardanic support for said member, a thin rod carried on said member and projected beyond the edge of the card to form a lubber line, and a liquid filling the bowl, whereby said member is substantially damped by said liquid when the bowl is moved and in turn damps the compass card, and whereby the angle between the card and the lubber line is maintained substantially constant.

4. A magnetic compass comprising a spherical container, a gimbal ring pivotally secured to the inner wall of the container, a shallow saucer-shaped member pivotally suspended from said gimbal ring and having a diameter nearly that of the inside of the container, a compass card pivotally secured to said member adjacent and parallel thereto, and a neutral liquid filling said container, said ring, member, and card being free to move through 360° relative to the container.

5. A magnetic compass comprising a spherical container, a shallow circular member including a flat rim and a slightly offset center portion cardanically suspended within the container as a substantially complete bisector of the sphere, a compass card pivotally mounted within the container in position normally to lie adjacent and parallel to said member within said rim, and a liquid filling said container.

6. A magnetic compass comprising a spherical bowl, a support disposed within the bowl, a gimbal ring of small diameter pivotally mounted on said support, a saucer-shaped member pivotally mounted upon said gimbal ring and having a diameter nearly that of the inside of the bowl, said member having a broad flat continuous rim and a flat bottom offset slightly from said rim, a pivot bearing mounted for movement with said member, a compass card smaller in diameter than said member, and a pivot carried by said card and working in said bearing, the dimensions of the elements being such that the distance between the bearing and the gimbal ring is relatively short, said card and rim being substantially co-planar with the normal horizontal equatorial plane of the bowl.

7. A magnetic compass comprising a spherical bowl, a pair of substantially flat dished members each being nearly as large in diameter as the inside of the bowl and secured together at their edges in opposed relation to define between them a chamber, a cardanic mount suspending said members in said bowl, a pivot member secured to the center of each member and disposed within the chamber, a compass card disposed between the members, and a pivot member secured to said card and engaged with the pivot members on said dished members, and a liquid filling the bowl and said chamber.

8. A magnetic compass comprising a bottom hemisphere, a transparent upper hemisphere secured to the bottom hemisphere, a support secured to the bottom hemisphere, a post mounted for vertical adjustment on said support, a cardanic mount secured to said post, a circular member nearly equal in diameter to that of the inside of the hemispheres and secured to said mount and having a flat annular portion wide enough to present substantial damping area lying normally substantially in the plane of the equator between the hemispheres adjacent the peripheries thereof, a lubber line mounted on said circular member, and a compass card universally pivotally mounted on said member, the pivot point for the card being disposed substantially concentric with the hemispheres, while the axes of the cardanic mount lie slightly vertically offset from the plane of said equator.

9. A magnetic compass comprising a spherical bowl, a circular plate disposed in the bowl and having a flat annular rim and a central portion offset slightly from the rim and nearly parallel thereto, gimbals supporting said plate, said plate having a diameter nearly that of the inside diameter of the bowl, and a compass card smaller in diameter than the circular member and pivotally mounted thereon within the annular rim, the gimbals, the rim of the plate, and the compass card all lying substantially in the same equatorial plane of the spherical bowl.

10. A magnetic compass comprising a truly spherical bowl, a lightweight saucer-shaped member cardanically mounted to lie normally in the horizontal equatorial plane of the bowl and large enough nearly to completely bisect the bowl and a compass card universally pivoted upon said member and disposed closely adjacent and parallel thereto.

11. A magnetic compass comprising a truly spherical bowl, a shallow saucer-shaped member nearly large enough to cover a complete equatorial plane through the bowl, a cardanic mount arranged to suspend said member substantially in the normal horizontal equatorial plane of the bowl, a compass card smaller in area than that of the member, a universal pivot mount carried by said member in position to support the compass card closely adjacent and parallel to the member, and a liquid filling the bowl, there being substantially equal volumes of liquid on either side of said member.

12. A magnetic compass comprising a substantially spherical bowl, a member having a flat annular rim wide enough to present substantial damping area and a shallow bottom depressed below the rim, said member having an area nearly filling an equatorial plane of the bowl, a cardanic mount arranged to suspend said member with its rim lying substantially in the normal horizontal equatorial plane of the bowl, a pivot mount carried by said member, a compass card pivotally mounted on said member, the rim of the member, the card and the pivot point being all substantially co-planar, and a liquid filling the bowl, said card being substantially concentric with the bowl.

WILFRID GORDON WHITE.

REFERENCES CITED

The following references are of record in the file of this patent:

UNITED STATES PATENTS

| Number | Name | Date |
|---|---|---|
| 1,930,775 | Schweisthal | Oct. 17, 1933 |
| 2,008,481 | Weber et al. | July 16, 1935 |
| 2,026,919 | Stright | Jan. 7, 1936 |
| 2,300,685 | McKay | Nov. 3, 1942 |

FOREIGN PATENTS

| Number | Country | Date |
|---|---|---|
| 54,503 | Austria | July 25, 1912 |
| 507,889 | Great Britain | June 22, 1939 |
| 705,549 | Germany | May 2, 1941 |
| 762,684 | France | Jan. 29, 1934 |